United States Patent Office 3,101,404
Patented Aug. 20, 1963

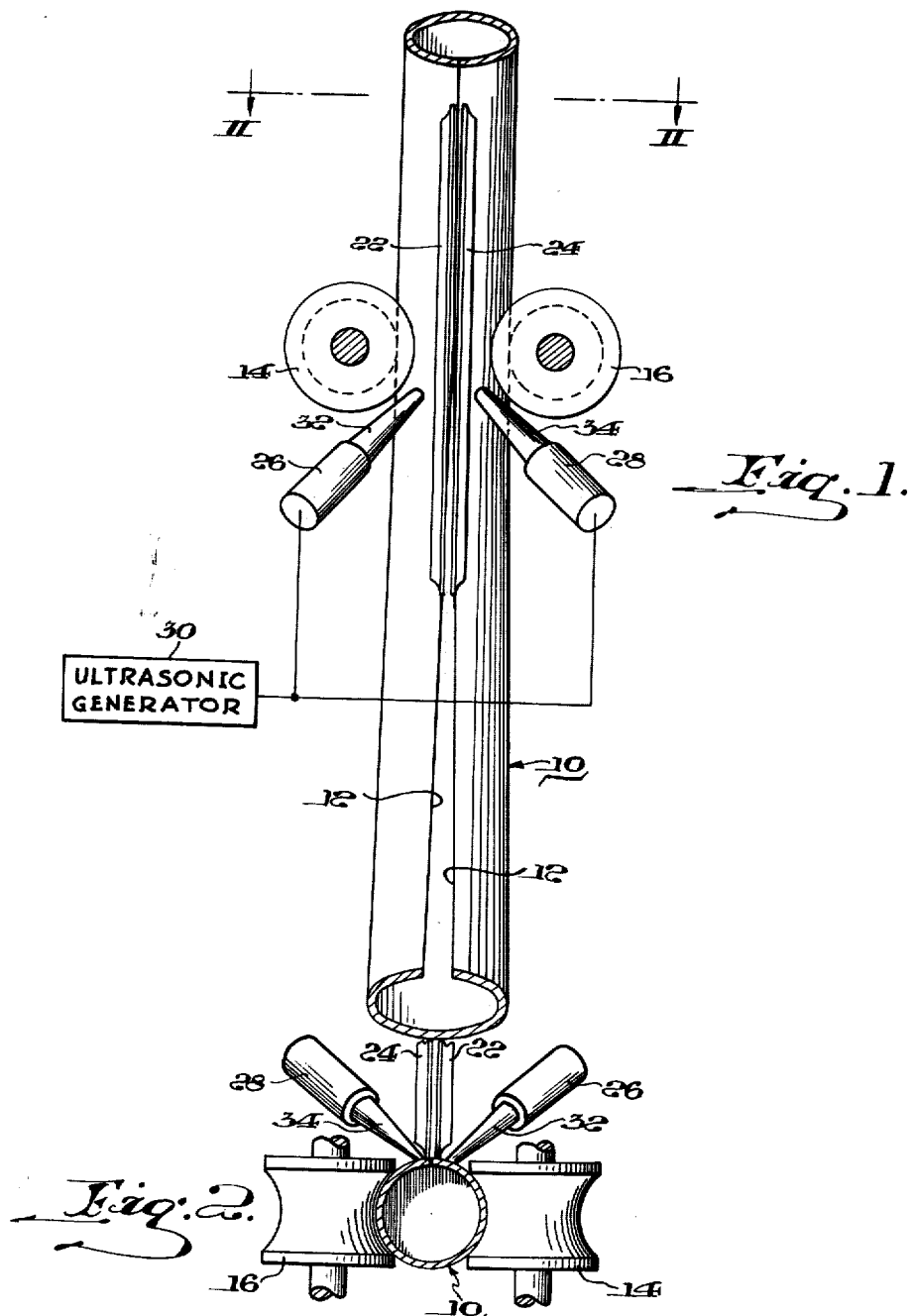

3,101,404
WELDING METHOD EMPLOYING
ULTRASONIC ENERGY
Joseph M. Hill, 8016 Marmion Drive, Pittsburgh 37, Pa.
Filed Jan. 29, 1962, Ser. No. 169,268
7 Claims. (Cl. 219—128)

This invention relates to a method for welding, and more particularly to a method for seam welding wherein both heat and ultrasonic energy are employed to effect a seam weld having improved characteristics over welds previously attainable.

Although generally applicable to any type of welding, the present invention is particularly adapted for use in the continuous seam welding of pipe and tube. In such a process, flat skelp or strip is formed into a cylindrical shape having its opposite edges forming an open seam which is thereafter welded to form the completed tube. In the usual welding process, the edges of the strip are initially heated, either by electric resistance or high frequency induction methods, and thereafter forced or squeezed together to form the weld. In this process, the edges along the seam are upset, causing an objectionable bead or burr to be formed along the weld which must be removed by outside diameter and inside diameter flash trimmers. The upset and resulting weld bead is necessary in prior art procedures since, among other reasons, an oxide surface is formed on the edges during heating thereof and pressure must be applied to break up or disperse this oxide coating in order to form a satisfactory weld. Furthermore, the melting and quick absorption of heat in the body of the cold tube causes, in effect, a quenching and hardening of the weld zone which is objectionable in the end product and often requires a subsequent annealing process.

Instead of heating the edges of the seam by electrical resistance or high frequency induction methods, the entire strip or skelp may be heated in a furnace before its formation into a tube and the opposing edges of the skelp squeezed together or upset in much the same manner as when only the edges are heated. In all of these processes a weld bead is formed which must be subsequently removed. This bead may be readily removed on the outside diameter of the tube; however, it is oftentimes difficult to remove from the inside diameter, particularly on small diameter tubes, and such a bead on the inside diameter is highly objectionable.

As an overall object, the present invention seeks to provide a method for welding which overcomes the above and other disadvantages of prior art methods to a considerable degree.

More specifically, an object of the invention is to provide a method for seam welding wherein the weld zone is subjected to ultrasonic vibrations to minimize the undesirable weld bead and to enhance the metallurgical characteristics of the weld.

In accordance with the invention, welding is achieved by the steps of heating two adjacent metal edges to the fusion temperature while bringing said edges close enough together to permit the two to weld together by means of an upset and simultaneously inducing vibrations in at least one of said edges whereby a weld will be formed at the edges without the formation of a substantial bead. Preferably, the vibrations mentioned above are in the ultrasonic frequency range, and the edges are preferably heated by electric resistance or high frequency induction methods, however any other method for heating may be used if desired. By introducing vibratory energy, and particularly ultrasonic energy, at the weld zone during welding, the amount of upset needed for a good weld is materially reduced and the weld quality is improved by a positive and uniform dispersion of the normal impurites and refinement of grain structure which reduces the brittleness characterized by current practices.

The above and other objects and features of the invention will become apparent from the following detailed description taken in connection with the accompanying drawings which form a part of this specification, and in which:

FIGURE 1 is a top or plan view illustrating the welding method of the invention; and FIG. 2 is a cross-sectional view taken along line II—II of FIG. 1.

Referring now to the drawings, and particularly to FIG. 1, an elongated tube 10 is shown, the same having been formed from flat metallic ribbon or skelp which, through a series of forming rolls (not shown), is shaped progressively into tubular form with the spaced edges of the ribbon disposed uppermost in position for welding. As shown in FIG. 1, the longitudinal edges 12 of the tube are spaced from each other in V-fashion and are gradually pressed together so that upon reaching the welding station, these edges are in abutting relationship and in the proper position for welding. As shown, there are a pair of hourglass pressure rolls 14 and 16 disposed opposite to each other at the welding zone and shaped to conform to the outside of the tube. These rolls are designed to force the edges of the tube into proper engagement.

Disposed in close proximity to the pressure rolls 14 and 16 are welding electrodes comprising rotatable discs 22 and 24 for conveying electric current to the tube 10 as the latter advances for effecting resistance welding of the tube as will be readily understood by those skilled in the art. Alternatively, the electric resistance welding method shown herein could be replaced by high frequency induction welding apparatus, or the entire ribbon or skelp could be heated prior to its formation into a tubular shape.

When the edges 12 of the tube 10 are heated by the electrodes 22 and 24 or by any other heating means, an oxide surface is formed thereon. Accordingly, in order to effect a dispersion of the oxide and produce a satisfactory weld, it is usually necessary to space the rolls 14 and 16 apart by an amount such that the edges 12 will be squeezed together or upset. This produces the undesirable weld bead mentioned above, which weld bead must be removed by flash trimmers. In addition, the welding process oftentimes changes the grain structure at the area of the weld, requiring a subsequent annealing process.

In accordance with the present invention, ultrasonic transducers 26 and 28 are provided which are connected to an ultrasonic generator 30. Any type of ultrasonic generator, well known to those skilled in the art, may be used for this purpose; but in the usual case it will comprise laminated magnetostrictive metallic elements arranged in a core configuration having a central opening. Wound around the core is a polarizing coil and an excitation coil, the arrangement being such that upon variation of the magnetic field strength in the excitation coil there will be produced variations in the dimension of the transducer, provided the polarizing coil is charged at a suitable level with direct current. These variations in dimension of the transducer produce ultrasonic vibrations which are applied through a tapered metallic coupling member 32 or 34 to the tube 10, the arrangement being such that the ultrasonic vibrations generated by the transducers 26 and 28 will be induced in the tube.

By thus inducing ultrasonic vibrations in the tube 10, the molten metal at the weld zone will be agitated, thereby causing it to bridge across the seam gap without requiring any sort of substantial upset and resulting weld bead. Furthermore, the agitation caused by the ultrasonic transducers 26 and 28 will effect a positive and uniform dispersion of the normal impurities such as the oxide formed at the edges 12 and will also induce refinement of the grain structure to reduce brittleness at the weld zone.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. The method of welding comprising the steps of heating two adjacent metal edges to a welding temperature while bringing said edges close enough together to permit the two to weld together, and inducing ultrasonic vibrations in at least one of said edges whereby a weld will be formed at the edges without the formation of a substantial bead.

2. The method of seam welding comprising the steps of moving two adjacent metal edges along a predetermined path of travel while bringing said edges close enough together to permit the two to weld together, heating said edges to a welding temperature, and inducing ultrasonic vibrations in at least one of said edges whereby a seam weld will be formed at the edges without the formation of a substantial bead.

3. The method of joining metal edges comprising the steps of welding said edges together while simultaneously inducing ultrasonic vibrations in at least one of said edges whereby a weld will be formed at the edges without the formation of a substantial bead.

4. The method of welding comprising the steps of heating two adjacent metal edges to a welding temperature while bringing said edges into close abutting relationship without substantially upsetting the same, and inducing ultrasonic vibrations in at least one of said edges whereby a weld will be formed at the edges without the formation of a substantial bead.

5. The method of welding comprising the steps of heating two adjacent metal edges to a welding temperature while bringing said edges into close abutting relationship without substantially upsetting the same, and inducing ultrasonic vibrations in at least one of said edges by bringing an ultrasonically vibrating member directly into intimate contact with the body of which said one edge is a part whereby a weld will be formed at the edges without the formation of a substantial bead.

6. The method of welding comprising the steps of heating two adjacent metal edges to a welding temperature while bringing said edges into close abutting relationship without substantially upsetting the same, and inducing ultrasonic vibrations in both of said edges whereby a weld will be formed at the edges without the formation of a substantial bead.

7. The method for continuously seam welding a tube or the like which comprises forming flat metal strip into a tubular shape having an open seam therein, and welding said edges together while simultaneously inducing ultrasonic vibrations in said tube in close proximity to the welding area whereby a weld will be formed at the seam without the formation of a substantial bead.

References Cited in the file of this patent
UNITED STATES PATENTS 1,865,845   Dyer _____ July 5, 1952

Notice of Adverse Decision in Interference

In Interference No. 94,299 involving Patent No. 3,101,404, J. M. Hill, Welding method employing ultrasonic energy, final judgment adverse to the patentee was rendered Dec. 1, 1964, as to claims 1, 2, 3, 4, 5, 6 and 7.

[*Official Gazette January 19, 1965.*]